Jan. 12, 1932.   A. DUKELOW   1,840,939
HARDPAN PLOW
Filed Dec. 16, 1929   3 Sheets-Sheet 1
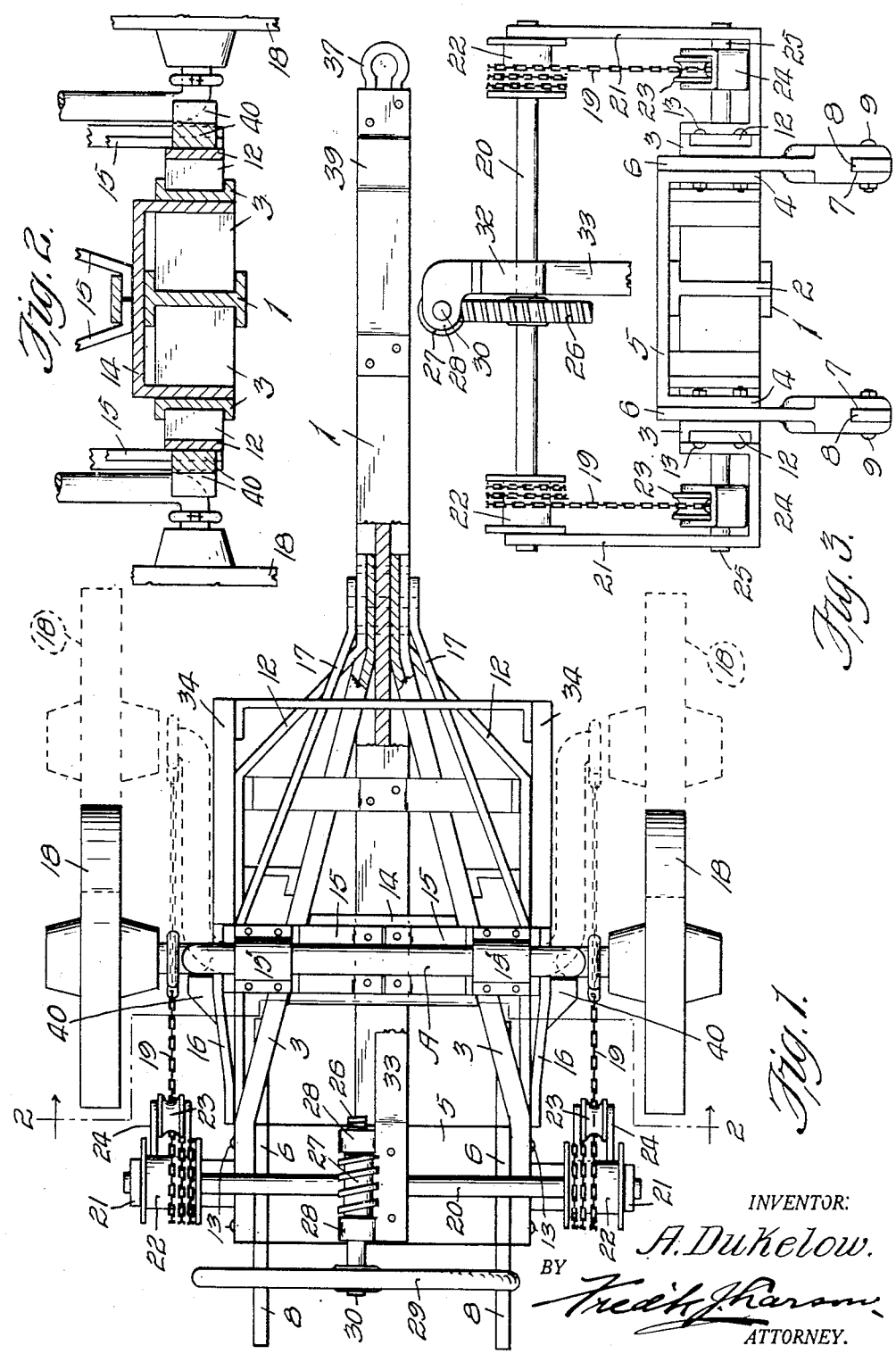
INVENTOR:
A. Dukelow.
BY
Fred'k J. Harson
ATTORNEY.

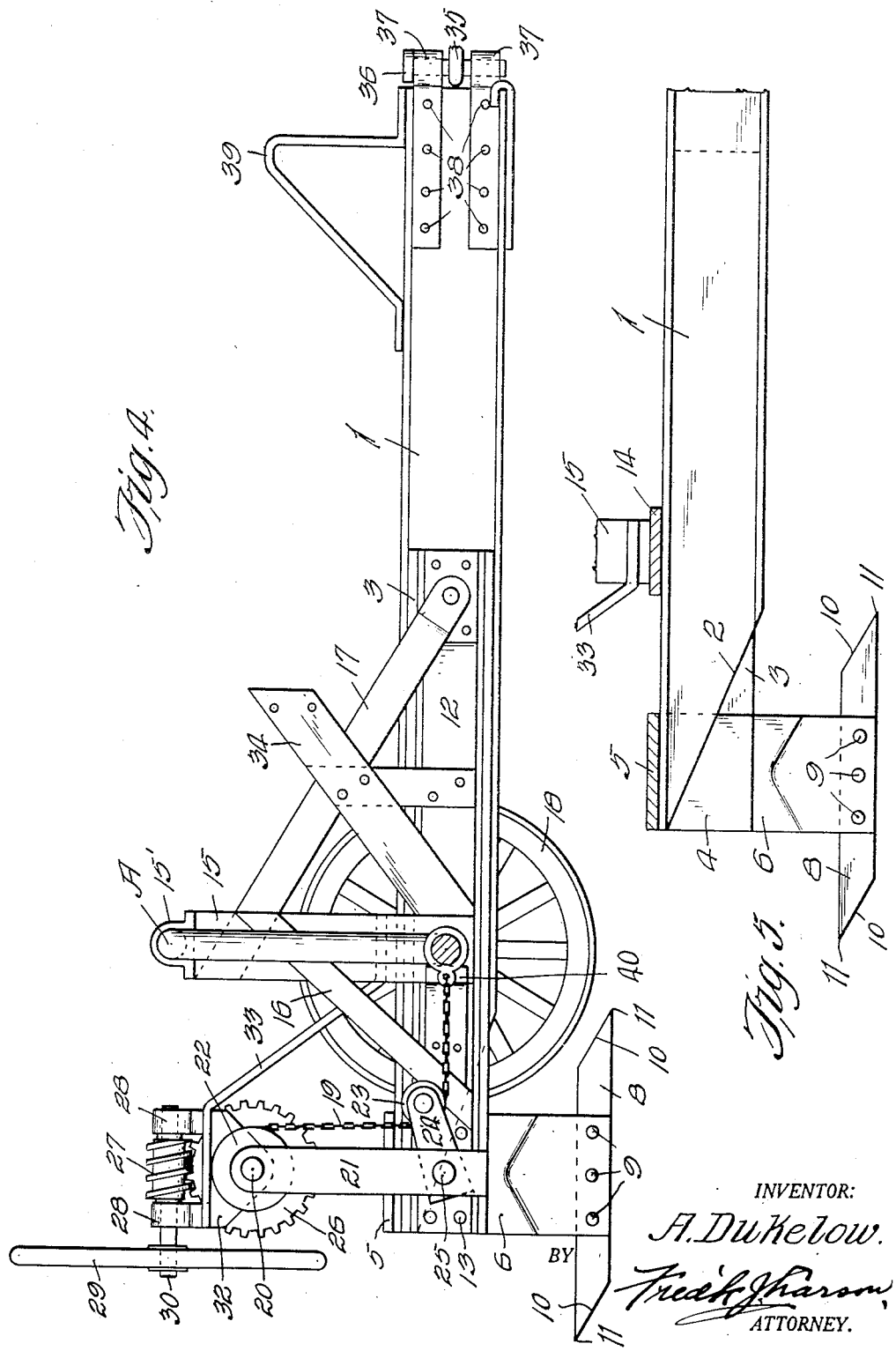

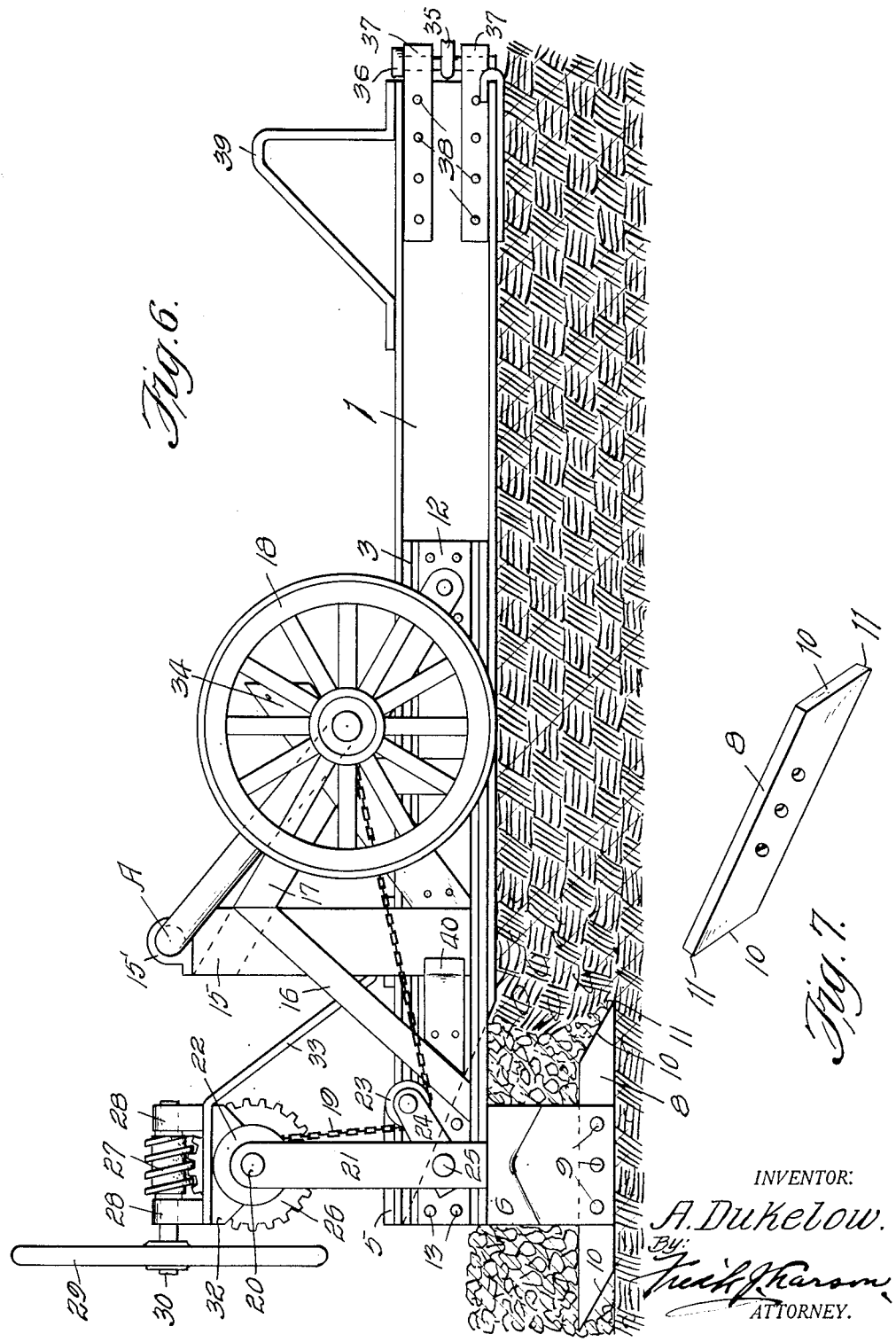

Patented Jan. 12, 1932

1,840,939

UNITED STATES PATENT OFFICE

ARTHUR DUKELOW, OF PIEDMONT, MISSOURI

HARDPAN PLOW

Application filed December 16, 1929. Serial No. 414,462.

My invention relates to plows and more particularly to a plow construction designed for plowing hard pan, rock and gravel bearing soil and other road surfaces, which otherwise would have to be blasted to loosen the same.

An object of my invention resides in providing a longitudinal plow beam which acts as a skid shoe to limit the depth that the plowshares can dig into the earth being plowed for loosening of the soil.

Another object of the invention resides in providing the device with a pivotally supported arched axle so that the wheels carried thereby will gradually move forward as the plowshares dig into the earth, thereby lowering the plow beam uniformly until its lower face is riding on the surface of the earth throughout its entire length.

A still further object of the invention resides in flexible means for connecting the ends of the axle adjacent the wheels with means fixed to a cross shaft which is manually rotated through the medium of a gear connection and a hand operated wheel for limiting the forward movements of the wheels and for bringing them back to normal position.

A still further object of the invention resides in the provision of means to limit the rearward movement of the axle beyond a perpendicular position.

A still further object of the invention resides in the provision of guide arms for guiding the arms of the axle in their forward and rearward movements.

A still further object of the invention is the provision of plowshares which are detachably supported and reversible.

A still further object of the invention is the provision of a plow which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1 is a plan view, partly in section, of a plow embodying the features of my invention.

Fig. 2 is a sectional elevation of the plow frame taken on line 2—2 of Fig. 1.

Fig. 3 is a rear end elevation of the plow with the axle and wheels removed.

Fig. 4 is a side elevation of the plow with the axle in vertical or normal position.

Fig. 5 is a detail of a portion of the plow beam.

Fig. 6 is a side elevation of the plow showing the supporting wheels in advanced position and the entire length of the plow beam riding on the surface of the soil to be plowed.

Fig. 7 is a detail of one of the plowshares.

In carrying out the aim of my invention, I employ a main plow beam member 1, which is preferably, although not necessarily in the form of a steel I-beam having its front lower corner cutaway to provide an inclined face 2 for the beam, as clearly shown in Fig. 5, thus providing clearance to permit rock and the like that has been raised when plowing to clear the beam, as the beam advances forward over the ground. A pair of side beam members 3 are connected at their forward ends to the side faces of the longitudinal main beam member 1 and then directed outwardly and rearwardly so as to widen the rear end of the beam structure, as clearly shown in Fig. 1.

Disposed between the ends of the side beam members 3 and the ends 4 of an inverted U-shaped metal spreader member 5 connected midway its length to the main beam member 1, are a pair of vertical shanks 6 which depend a suitable distance below the lower faces of the side beam members, as clearly shown in Figs. 3 and 5.

The lower ends of the shanks 6 are bifurcated as at 7 to receive the plowshares 8 which are connected to the shanks 6 by means of suitable fastening devices, such for instance, as bolts 9.

The plowshares, one of which is shown in detail in Fig. 7, is preferably made from a rectangular bar of steel having its ends both beveled in the same direction, as at 10 to provide each end of the share with penetrating point 11. By this construction of share, it will be observed, as the point at one end of the share wears down as it will very rapidly in plowing hardpan soil impregnated with gravel, rock and similar abrasive earth substances, the share can be reversed upside down, thus making it possible to use both ends of the shares before it will be necessary to apply a new share to the plow structure or have the old ones repointed.

The beam structure also includes a pair of side members 12 which are connected at their forward ends to the side beam members 3. The side members 12 are directed outwardly and rearwardly from their forward ends and then finally rearwardly to lie parallel to the main plow beam 1, as shown in Fig. 1. The rear ends of the side members 12 connect with the outer faces of the rear ends of the side beam members 3. The shanks 6 are held against displacement by means of bolts 13 carried by the ends of the spreader plate and the side members of the plow structure, as will be apparent from Figs. 3 and 4.

An inverted U-shaped spreader plate 14 is connected midway its ends to the main plow beam 1 a suitable distance in advance of the rear spreader plate 5 and it has its ends connected with the side beam members 3, as clearly shown in Fig. 2.

A pair of suitable bearing standards or upright supports 15 are connected at their lower ends to the main beam spreader plate 14 and the side members 12 and are provided at their upper ends with suitable bearings 15′ in which the upper cross member of a deep crank axle A is journaled, as will be apparent from Figs. 1, 3 and 4. The bearing standards or crank shaft supports are each braced by means of a rearwardly and downwardly directed brace member 16 and a forwardly and downwardly directed brace member 17.

The lower ends of the crank axle carry the land wheels 18 and when the axle is in its normal vertical position, as shown in Figs. 1 and 4, the axle ends assume positions intermediate the upper and lower faces of the beam structure, but are capable of being with the wheels relative to the plowshares to the dotted line position shown in Fig. 1 and full line position as shown in Fig. 6 during plowing operations.

A pair of chains 19 or equivalent flexible means are employed to connect the ends of the axles upon which the land wheels are mounted with an elevated cross-shaft 20 which is journaled at its ends in the upper ends of a pair of upright standards 21, which standards are connected at their lower ends to the rear end of the beam structure, as shown in Figs. 3 and 4. The cross-shaft 20 is provided at its ends with a pair of suitable drums 22 to which the upper ends of the chains 19 are connected and upon which the chains are adapted to be wound. The chains 19 ride over tension pulleys 23 supported by suitable clevis members 24 which are pivotally supported by shafts 25 at the lower ends of the upright standards 21, as shown in Figs. 3 and 4.

The means for rotating the cross-shaft 20 embodies a worm gear 26 fixed to the cross-shaft 20, a worm 27 journaled in the bearings 28 which mesh with the worm gear and a hand-wheel 29 which is fixed to the worm shaft 30, which shaft is journaled in suitable bearings 31 supported by a member 32 mounted on the cross-shaft 20 and held against displacement by means of a brace member 33.

The lower or forward ends of the chains 19 are connected to the ends of the crank axle adjacent the land wheels, as clearly shown in Figs. 1 and 4.

The beam structure of the plow is further provided with a pair of forwardly and upwardly directed axle guide members 34 to prevent extreme lateral displacement of the crank axle and lateral shifting of the land wheels as the wheels move forward relative to the plowshares, as the plowshares are forced into the earth due to forward movement of the beam structure, which beam structure is pulled by means of a suitable tractor through the medium of a suitable cable connection 35 which is detachably connected with a coupling pin 36 carried at the forward end of the main beam by means of suitable looped strap members 37 connected to the sides of the main beams by means of suitable fastening devices 38.

The forward end of the main beam is also provided upon its upper face with an upright bumping member 39 against which a member of the tractor can engage to impart rearward or backing up movement to the plow when desired.

In operation, the plow is attached to a tractor or other powerful mobile power plant and as the plow is moved forwardly, the chain is gradually released or unwound by means of the hand wheel 29. The releasing of the chain allows the land wheels to advance forward relative to the main beam and to the plowshares during the advancing movement of the plow, thus allowing the plowshares to bite or cut into the earth until the main plow beam lies its entire length upon the surface of the soil to be plowed and which acts as a shoe to positively limit the cutting by the plowshares and thereby obviating any low places being made by the plowshares. The forward movement of the land wheels and ends of the arched axle keeps them out of the way of rock, or anything else that the plowshares might root up and this feature is deemed by me as an essential feature of my invention.

During plowing operations, the earth is not rolled over as with any ordinary plowshare, and they do not cut a furrow, but merely loosen up the earth to the depth of the cut. The earth is thoroughly loosened between the two plowshares as well as to a short distance to the outer sides of the plowshares, thus leaving the plowed or loosened soil or earth in such a state that it can be readily handled by scrapers.

My plow will actually loosen up a path of hardpan soil, where other plows will not function at all and which would heretofore have to be blasted to loosen the same for scraping operations.

When it is desired to bring the plowshares out of the ground, the operator turns the hand wheel which imparts rearward movement to the land wheels until the crank axle is brought back to a vertical position, and against stops 40.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In a hardpan plow, a beam shaped to function as a sled runner, a wheeled crank axle mounted to swing forward to allow the beam to come into contact with the ground and means for swinging the crank axle to raise the beam.

2. In a hardpan plow, a beam frame structure shaped to function as a sled runner, plowshares carried by and below the rear end of the beam structure, a wheeled crank axle mounted to swing forward to allow the beam to come into contact with the ground and means for swinging the crank axle to raise the beam from contact with the ground.

3. In a plow structure, a beam frame structure widened at its rear end to function as a sled runner, a pair of spaced plowshares disposed below and connected with the widened end of the beam structure, a wheeled crank axle mounted to swing forward to allow the beam to come into contact with the ground and means for swinging the crank axle to raise the beam from contact with the ground.

4. In a plow structure, a beam shaped to function as a sled runner, spaced plowshares carried by the widened end of the beam structure, a pair of spaced uprights supported by the beam, a wheeled crank axle mounted upon said uprights to swing forward to allow the beam to contact with the ground and means for swinging the crank axle to raise the beam from contact with the ground.

5. In a plow structure, a longitudinal beam shaped to function as a sled runner, plowshares carried on opposite sides of the rear end of the beam, a wheeled crank axle mounted transversely of the beam to swing forward at its wheel supporting ends to allow the beam to contact with the ground to limit depth of the cut of the plowshares and means for swinging the wheel supporting ends of the crank axle to raise the beam from contact with the ground.

6. In a hardpan plow structure, a longitudinal beam shaped to function as a sled runner, reversible soil loosening means connected with the beam, a wheeled crank axle mounted to swing forward to allow the beam to be gradually lowered into contact with the surface of the ground as the plowshares cut into the ground and means for swinging the crank axle to raise the beam and withdraw the plowshare from within the ground.

7. In a hardpan plow structure, a longitudinal beam shaped to function as a sled runner, reversible soil loosening means connected with the beam, a wheeled crank axle mounted to swing forward to allow the beam to be gradually lowered into contact with the surface of the ground as the plowshares cut into the ground, means for swinging the crank axle to raise the beam and withdraw the plowshare from within the ground and means for limiting swinging movement of the crank axle when raising the beam.

8. In a plow structure, a wheeled crank axle supported beam disposed between the wheels of the crank axle, means for mounting the crank axle above the beam, plowshares for said beam, means allowing the wheeled crank axle to swing forward to allow the beam to come into contact with the surface of the ground as the plowshares cut into the ground for loosening the same and for swinging the crank axle to raise the beam from the surface of the ground and means for limiting swinging movement of the crank axle when raising the beam.

9. In a plow structure, a wheeled crank axle supported beam disposed between the wheels of the crank axle, means for mounting the crank axle above the beam, plowshares for said beam, means allowing the wheeled crank axle to swing forward to allow the beam to come into contact with the surface of the ground as the plowshares cut into the ground for loosening the same and for swinging the crank axle to raise the beam from the surface of the ground, means for limiting swinging movement of the crank axle when raising the beam and a bumping member secured to the forward end of the beam.

10. In a plow structure, a wheeled crank axle supported beam disposed between the wheels of the crank axle, means for mounting the crank axle above the beam, plowshares for said beam, means allowing the wheeled crank axle to swing forward to allow the beam to come into contact with the surface of the ground as the plowshares cut into the ground, for loosening the same and for swinging the crank axle to raise the beam from the surface of the ground, means for limiting swinging movement of the crank axle when raising the beam, a bumping member secured to the forward end of the beam and means carried at the forward end of the beam for connecting same for towing behind a tractor adapted to pull the plow.

11. In a hardpan plow adapted to be towed by a tractor, a beam shaped to function as a sled runner, plowshares for said beam, a wheeled crank axle mounted to swing to move the wheels forward to allow the beam to come in contact with the surface of the ground when the plowshares have entered the ground and means for swinging the crank axle to raise the beam from contact with the surface of the ground and raise the plowshares from within the ground.

12. In a hardpan plow adapted to be towed behind a tractor, a longitudinal I-beam shaped to function as a sled runner, a bumping member carried by the forward end of the beam, members directed laterally and rearwardly from the sides of the beam, means connecting said members with the rear end of the beam, shanks depending from the rear ends of said members, soil loosening members having reversed inclined pointed ends detachably secured to the shanks, a wheeled crank axle mounted to move forward to allow the beam to come in contact with the ground, means for guiding the swinging movement of the crank axle, means for swinging the crank axle to raise the beam from the ground and raise the soil loosening members from within the ground and means for limiting swinging movement of the crank axle when raising the beam from contact with the ground.

In testimony whereof, I have hereunto affixed my signature.

ARTHUR DUKELOW.